United States Patent [19]
Siegenthaler et al.

[11] Patent Number: 5,644,122
[45] Date of Patent: Jul. 1, 1997

[54] GRIN OPTICAL SYSTEM

[75] Inventors: Kenneth E. Siegenthaler, Colorado Springs, Colo.; James R. Rotge, Albuquerque, N. Mex.

[73] Assignee: Aptek, Inc. (Siegenthaler), Colorado Springs, Colo.

[21] Appl. No.: 500,615

[22] Filed: Jul. 11, 1995

[51] Int. Cl.⁶ .................................................. G02B 23/04
[52] U.S. Cl. ................................... 250/214 VT; 359/652
[58] Field of Search .................................. 359/652, 653, 359/654, 424, 434; 250/214 VT

[56] References Cited

U.S. PATENT DOCUMENTS

| | | | |
|---|---|---|---|
| 3,737,667 | 6/1973 | Babb et al. | 250/239 |
| 5,084,780 | 1/1992 | Phillips | 359/350 |
| 5,093,719 | 3/1992 | Prescott | 359/652 |
| 5,111,035 | 5/1992 | de Luca | 250/214 VT |
| 5,408,088 | 4/1995 | Chapman et al. | 250/214 VT |

OTHER PUBLICATIONS

U.S. Statutory Invention Registration, Registration #: H1321 Atkinson III et al, Publication Date: Jun. 7, 1994.

*Primary Examiner*—Edward P. Westin
*Assistant Examiner*—Kevin Pyo
*Attorney, Agent, or Firm*—John B. Phillips

[57] ABSTRACT

An optical system includes graded refractive index ("GRIN") optical elements. An objective optical element and an ocular optical element, each including at least one GRIN element, are located in an optical path which is substantially voidless. The optical system is not susceptible to fogging due to the absence of voids in the optical path. An image intensifier may be positioned in the optical path between the objective and ocular optical elements. The image intensifier responds primarily to invisible light and creates an amplified level of light substantially at a predetermined visible wavelength. A beam splitter may be used to split the light from the objective optical element into ranges of visible and invisible wavelengths. The range of visible light is directed through a first light channel to a beam combiner. The range of invisible light is directed through a second light channel to the image intensifier. The invisible light is changed to visible light substantially at the predetermined wavelength by the image intensifier. The beam combiner combines the visible light from the first and second light channels to achieve viewing in both high level and low level light conditions.

9 Claims, 9 Drawing Sheets

GRIN OPTICAL SYSTEM

This invention was made with U.S. Government support under contract N00164-90-C-0170 awarded by the U.S. Navy. The U.S. Government has certain rights in the invention.

FIELD OF THE INVENTION

This invention relates generally to optical systems for viewing distant objects. More particularly, the present invention relates to a new and improved optical system which employs graded refractive index ("GRIN") optical elements to overcome many of the problems and disadvantages common to typical optical systems formed from conventional refractive lens elements. Even more particularly, the present invention relates to a new and improved optical sight which combines GRIN optical elements and an image intensifier to achieve improved viewing in low light level conditions.

BACKGROUND OF THE INVENTION

Optical systems are used for a variety of purposes. A typical use is for telescopic viewing, to enlarge the image of a distant object. Telescopes, binoculars, microscopes and aiming sights for firearms, weapons, cameras, and surveying transits, are well known examples of optical systems which achieve image enlargement. Other optical systems create image reduction, such as the lenses of a camera. Still other optical systems achieve only a viewing advantage, such as periscopes for observations of experiments or for surveillance and optical inspection systems for underwater or unaccessible location viewing.

The most common optical system is formed by a number of optical lenses separately spaced at predetermined positions along an optical axis. The position and shape of the lenses achieve the desired image enlargement, image reduction or other optical effect. The optical effect occurs as a result of light refraction occurring at the surface of the lens where the lens interfaces with another different refractive medium adjacent to the lens. The other medium is usually air or a different type of glass.

The common lens and air gap construction of optical instruments has resulted in certain disadvantages and drawbacks. The clarity of vision through the optical system depends on the ability to maintain fixed positions of the lenses along the optical path. A mechanical housing, tube or other structure is normally employed to hold the lenses at these fixed positions. However, the mechanical structure is subject to changes in dimensions due to rough handling, thermal effects and mechanical distortion, thereby diminishing the desired optical effect. Furthermore, moisture in the air between the lenses in a closed housing may condense on the lenses in certain humidity and temperature conditions, thereby fogging the lenses.

The mechanical problems of maintaining the lens positions have been solved by using strong mechanical lens housing structures which are generally bulky and heavy. While these types of mechanical structures are usually effective, the weight and size of the housing structures creates drawbacks. For example, heavy binoculars and hand held telescopes are often difficult to hold steady for extended time periods. Additionally, hunters and soldiers find the added weight and bulk of a telescopic sight on a firearm increases the difficulty of carrying and manipulating the firearm.

The problem of lens fogging has been solved by hermetically sealing the optical instrument housing and filling the spaces between the lenses with dry nitrogen gas. The nitrogen gas prevents the ambient humidity from entering the housing. Without moisture in the housing there is no moisture to condense. The long term viability of the nitrogen gas solution depends on the ability of the housing to contain the gas. The seals and the other mechanical aspects of the sight may allow the nitrogen gas to dissipate and be replaced with ambient humidity over time. Furthermore the seals and other confinement structures contribute to the weight, size, fragility and complexity of the optical instrument.

Another limitation of any telescopic optical instrument is that its effectiveness is directly related to the level of the ambient light. To achieve perceptible magnification levels, it is necessary that adequate light illuminate the object being viewed. An increase in magnification has the effect of diminishing the amount of light perceived by the user. Thus if the object viewed is inadequately illuminated, the magnified object will not be seen clearly. It is for this reason that microscopes frequently include auxiliary light sources to augment the ambient light, thereby allowing adequate perception of the object being viewed. In general, however, optical instruments themselves are typically incapable of enhancing the light energy of the magnified object.

It is with respect to these and other background considerations, limitations and problems, that the optical instrument of the present invention has evolved.

SUMMARY OF THE INVENTION

An optical instrument of the present invention includes graded refractive index ("GRIN") optical elements. An "objective" GRIN optical element has a front surface upon which the light from an object impinges and a rear surface from which the light from the object passes. An "ocular" GRIN element has a front surface upon which the light enters and a rear surface from which the light from the optical instrument passes. The ocular GRIN element is positioned in an optical path with the objective GRIN element, and the optical path from the front objective surface to the rear surface of the ocular element consists of only solid material. As a consequence, the optical instrument of the present invention is not susceptible to fogging with moisture since there is no gas in the optical path to contain the moisture. The sight is rugged because fragile lens mountings are eliminated. Instead, the solid lens assembly becomes a part of the mechanical system, thereby reducing the requirement for massive mounting structures. The small size, light weight, ruggedness and performance of the optical instrument make it very useful as an aiming sight for a firearm.

Another aspect of the invention positions an image intensifier in the optical path between the objective and ocular GRIN elements. The image intensifier responds primarily to invisible or low energy light and creates an amplified level of visible light, making low level light viewing possible or more easily accomplished without an auxiliary light source.

Another aspect of the invention incorporates a beam splitter which receives the light from the objective GRIN element and splits the light from the objective GRIN element into visible and invisible wavelengths. The visible light is directed through a first light channel to a beam combiner. The invisible light is directed through a second channel to the image intensifier. The invisible light directed to the image intensifier is changed to visible light by the image intensifier and is directed from the second channel to the beam combiner. The beam combiner combines the visible light from the first and second light channels to achieve viewing in both high level and low level light conditions, thereby facilitating viewing of objects in both day-time and night-time with the same optical instrument.

When used as an aiming sight for a firearm, an aiming reticle is positioned within the light path through the sight. By positioning the reticle in this manner, the user is not required to constantly refocus his eye between the sights on the firearm and a distant object, thereby making the aiming function more easily accomplished by persons of all ages and levels of training.

Other aspects, features and details of the present invention can be more completely understood by reference to the following detailed description of the preferred embodiment, taken in conjunction with the drawings, and from the appended claims.

DETAILED DESCRIPTION OF THE DRAWINGS

DESCRIPTION OF PREFERRED EMBODIMENTS

Figure 1:
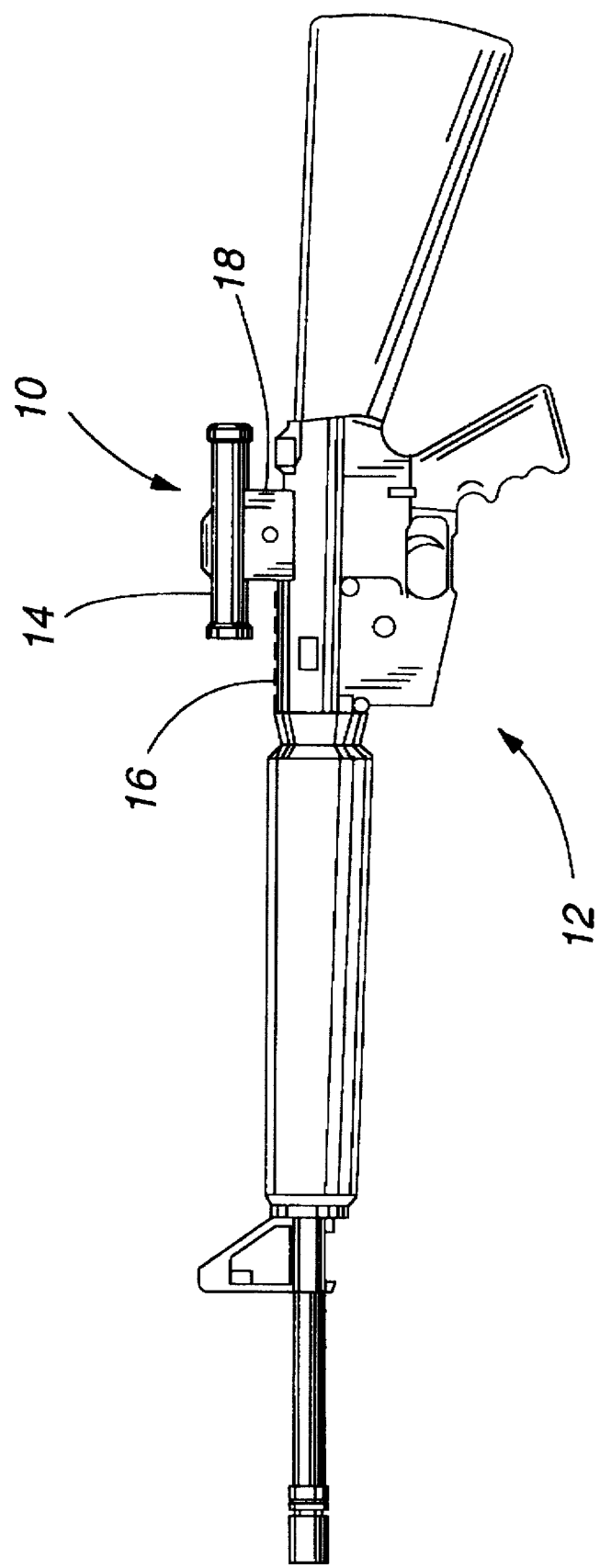
FIG. 1 is a perspective view of a GRIN optical instrument of the present invention used as a telescopic aiming sight mounted on a firearm.

The optical instrument of the present invention may be embodied in a variety of different optical devices such as telescopes, binoculars, microscopes, surveying transits and aiming sights for firearms, weapons, cameras and the like. One such optical instrument 10 is shown in FIG. 1 as an aiming sight for a rifle 12, such as the military rifle shown, or a sporting, target or hunting rifle (not shown). The sight 10 includes a housing 14 which is attached to a frame 16 of the rifle 12 by a mounting bracket 18. The housing 14 is preferably formed of a structurally rigid material such as metal, and has a tubular configuration which retains the optical elements of the sight 10. The position of the sight 10 on the rifle 12 is at a location convenient for an individual aiming the rifle to look through the sight while holding the rifle in a conventional manner. The optical sight 10 offers particular advantages as a telescopic aiming sight for a rifle, as is discussed below, but a similar optical instrument may be employed for many purposes other than aiming a firearm.

Figure 2:
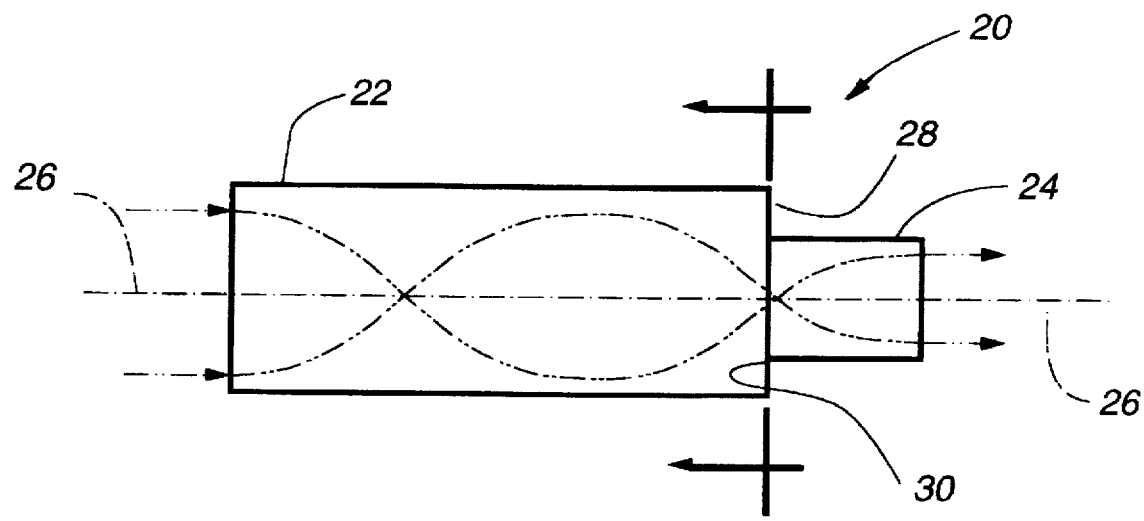
FIG. 2 is a generalized side view of optical elements of one embodiment of a GRIN optical sight of the present invention, illustrating a refractive light path by dashed lines.

The optical elements of a first embodiment 20 of an optical sight of the present invention are shown in FIG. 2. A housing 14 (FIG. 1) which holds the optical elements of the sight 20 is not shown in FIG. 2. The optical elements of the sight 20 include a graded refractive index ("GRIN") optical objective or field element 22 and a separate GRIN optical ocular or eyepiece element 24. Since the GRIN elements 22 and 24 are usually longer than they are wide, radial GRIN elements are sometimes referred to as GRIN rods. The GRIN rods 22 and 24 are centered about an optical axis 26, and end surfaces 28 and 30 of the GRIN rods 22 and 24, respectively, are perpendicular to the optical axis 26.

Figure 3:
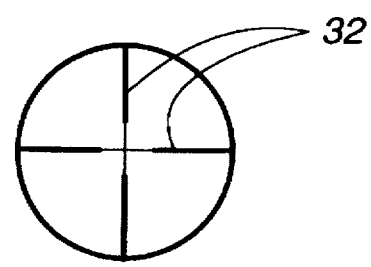
FIG. 3 is a section view of FIG. 2 taken substantially in the plane of line 3—3.

A reticle 32 is located in the plane of one or both of the surfaces 28 and 30, as is shown in FIG. 3. The reticle 32 is used for aiming the sight 20 and any other device to which the sight 20 is attached, for example the rifle 12 (FIG. 1). The reticle 32 may be formed by etching it into one of the surfaces 28 or 30, or by sandwiching a thin transparent substrate (not shown) with a reticle formed on it between the surfaces 28 and 30.

Although the embodiment of the optical system illustrated in FIG. 2 is based on radial GRIN elements, it should be understood that the concept can be implemented using various GRIN optical profiles including radial, axial, spherical, or a combination of these GRIN geometries. Both GRIN rods 22 and 24 are conventional radially graded index GRIN optical elements. Radial GRIN rods have refractive indices that vary as a function of the radial position from the optical axis 26. A typical radial GRIN element has a refractive index profile given by the following equation (1):

$$n(r)=n_o(1-Ar^2),$$

where $n(r)$ is the index of refraction as a function of radius $(r)$, $n_o$ is the value of the index of refraction on the optical axis 26, and A is a quadratic gradient constant.

According to equation 1, the greatest index of refraction occurs at the optical axis 26 where r is equal to 0, and the least index of refraction occurs near the outer radial edge of the GRIN element. The resulting radial variation of the refractive index creates a spatially varying refractive light path along the length of the GRIN rod as shown in FIGS. 4–7.

Figure 4:
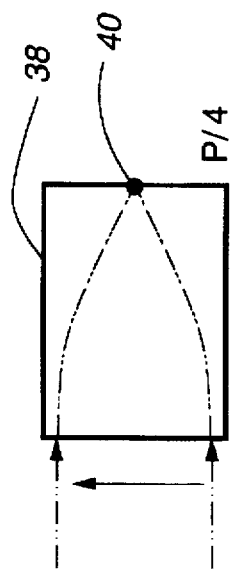
FIGS. 4–7 are illustrations of spatially varying refractive paths of initially parallel light rays refracted while traversing radially graded index GRIN optical elements of different lengths.
Figure 5:
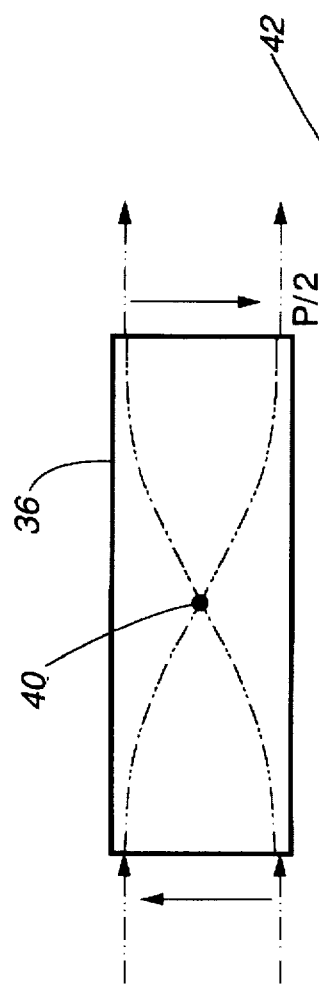
Figure 6:
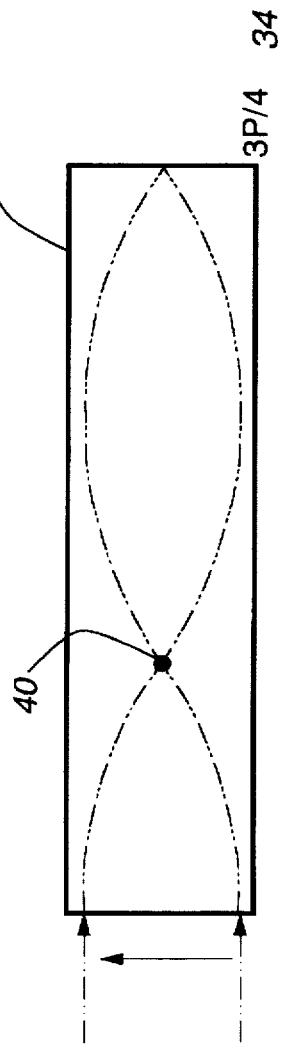
Figure 7:
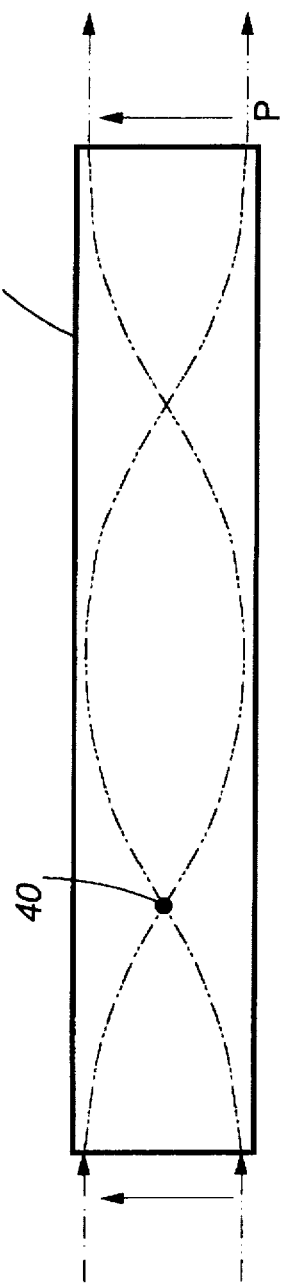
Figure 8B:
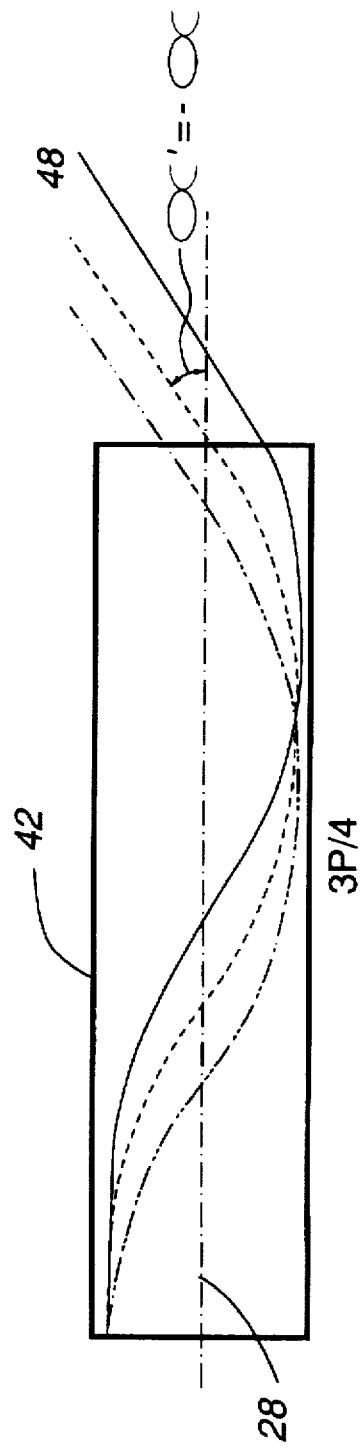
FIGS. 8A and 8B are illustrations of the inversion of ray exit angles with respect to an optical axis for a one-quarter pitch length GRIN rod (FIG. 8A) versus a three-quarter pitch length GRIN rod (FIG. 8B).
Figure 8A:
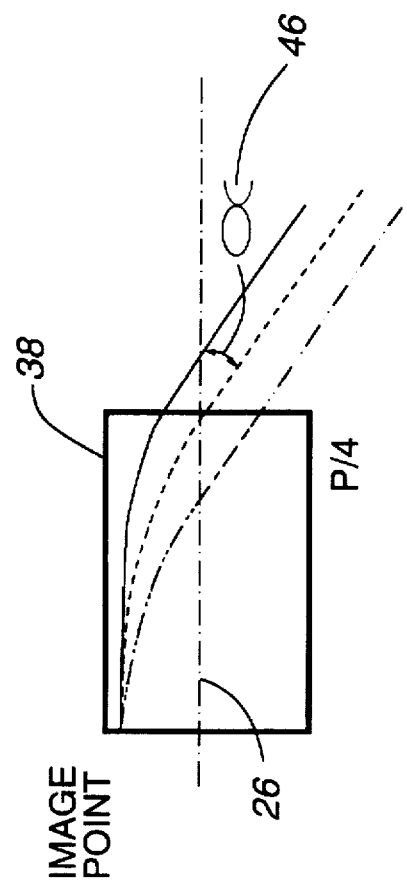

The optical effect created by a radially graded index rod can be described in terms of pitch length ("P"), and is shown in FIGS. 4–7. One complete cycle of light ray refraction is accomplished when a GRIN rod has a length of one P. A GRIN rod 34 of one P is shown in FIG. 7. The original upright image incident on the left end (as shown) of the GRIN rod 34 is inverted and then returned to its upright position and original size at the right end (as shown) of the GRIN rod 34 by the varying refractive light path which occurs along the length of the rod 34. A GRIN rod 36 which is one half the length of the GRIN rod 34 has a one-half P, as is shown in FIG. 5. An image formed upright on the left end (as shown) of the GRIN rod 36 is inverted and is of its original size on the right end (as shown) of the GRIN rod 36. A one-quarter P GRIN rod 38 is shown in FIG. 4. A one-quarter P GRIN rod 38 transforms the incident image on the left end (as shown) into a series of rays exiting from a focused point 40 on the right end (as shown). The angle which these rays make with the optical axis 26 is determined by their point of origin at the left end of the rod. Because the optical effect is cumulative, a three-quarter P GRIN rod 42 produces the effect of a one-half P rod and a one-quarter P rod placed end-to-end. Thus, an image present on the left end (as shown) of the three-quarter P rod will be inverted at the one-half P position, and a series of rays will exit the right face (as shown) of the rod 42, with each ray's direction being solely dependent on its point of origin at the left face. Although the rays exiting the rod 42 make an angle with respect to the optical axis 26 which is equal in size to the angle made by the rays exiting the one-quarter P rod 38, the ray angle from the rod 42 has a relative negative value since the preceding one-half P section of the rod 42 produces an inverted image. FIGS. 8A and 8B illustrate the phenomenon of the inversion of ray exit angles, 46 and 48, with respect to the optical axis 26 of the one-quarter P GRIN rod 38 and the three-quarter P GRIN rod 42, respectively. Thus, as illustrated in FIGS. 4–8, the pitch length of a radially graded GRIN rod establishes the locations along the actual length of the rod where upright or inverted images are formed.

As is apparent from FIGS. 4–7, inverted images occur at GRIN rod locations (measured from the surface of the GRIN rod upon which the incident image is initially projected) defined by the following expression (2):

$$P(1+n)/2,$$

where n=0, 2, 4 . . .

Upright images are formed at GRIN rod locations defined by the following expression (3):

$$nP$$

where n=1, 2, 3. . . Sequential images thus alternate between inverted and upright along the length of the GRIN rod.

The pitch length (P) of a GRIN rod is directly related to the radially graded refractive index of the GRIN rod, which is established by equation (1). The type of optical material from which the GRIN rod is formed determines the index of refraction of the GRIN rod, and hence, the P of the GRIN rod.

Magnification in a GRIN optical system is possible by mating GRIN rods of different pitch length (P). In the optical sight 20 shown in FIG. 2, the two radially graded index GRIN rods 22 and 24 are placed end to end. The magnification of the sight 20 is equal to the P of the objective GRIN rod 22 divided by the P of the ocular or eyepiece GRIN rod 24, as shown in the following equation (4):

$$M=P_{obj}/P_{ocul},$$

where M is the magnification, P is the pitch length, and "obj" and "ocul" refer to objective and ocular, respectively. If the two GRIN rods 22 and 24 have the same P the sight will have a 1X power of magnification. If the objective GRIN rod 22 has a longer pitch length than the eyepiece GRIN rod 24, the sight has positive magnification. Depending on the application, it may or may not be desirable for an optical system of the present invention to create magnification.

For aiming sights, one of the primary benefits of the present invention is that the object viewed and the reticle by which aiming is achieved are both focused at infinity. This has the effect of allowing the user's eye to focus at a single position rather than requiring simultaneous multiple focus points, which is not achievable when aiming a firearm. Firearms with conventional iron sights have a rear sight near the shooter's eye and a front sight at the end of the barrel (which may be as much as one-half to one full meter from the shooter's eye in the case of rifles). Meanwhile, the target at which the shooter is aiming is much farther away. While it may be relatively easy for younger people to quickly achieve multiple focus points, it becomes increasingly difficult or impossible for older people to do so as the eye muscles become less flexible.

Another advantage of the optical sight 20 of the present invention is that it is extremely rugged. The GRIN rods are solid elements which may be held firmly in place by a relatively simple mechanical housing. The GRIN rods become essentially immune to the risks of deformation common to the more fragile lens mounting systems typical with many optical sights. The sight 20 is also compact, and relatively light in weight. The GRIN rods are typically physically small and light compared to conventional lenses and the housings which confine the conventional lenses. The small number of components and the simplicity with which they may be assembled and confined in a housing represent further improvements over conventional optical sights. Furthermore, the sight 20 has no air or gas gaps between the optical elements, thereby avoiding the problem of fogging due to moisture condensation resulting from the loss of gas confined within the hermetically sealed housing. The only field maintenance required is a periodic cleaning of the front and rear external surfaces of the optical sight. In addition, because there are no air gaps between the optical components, it is much less likely that the optical sight will become misaligned due to shocks and vibrations as is the case with conventional optical sights. All of these features represent distinct advantages over present telescopic sights.

Figure 9:
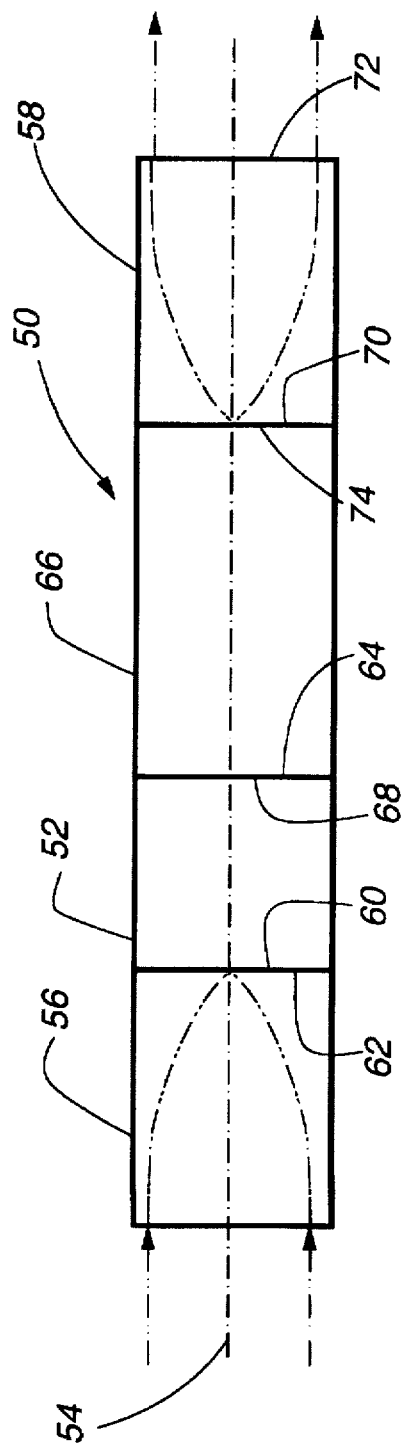
FIG. 9 is a generalized side view of optical elements of another embodiment of a GRIN optical sight of the present invention, which incorporates an image intensifier.

A second embodiment 50 of the optical sight of the present invention, shown in FIG. 9, includes an additional desirable feature—the ability to function in low light level conditions. The low light level functionality is obtained as a result of the use of an image intensifier 52 which is positioned in the optical path on an optical axis 54 between an objective GRIN rod 56 and an ocular or eyepiece GRIN rod 58. Image intensifiers are well known and are typically used in passive night vision equipment. Image intensifiers amplify the available light from the stars, the moon, or other low level light sources. The image intensifier 52 thereby serves as a light amplifier to present an image to the user which is visible even in low level light conditions. The optical sight 50 may therefore be used in low level light conditions where the optical sight 20 would not function adequately due to the low light level.

In the sight 50, the objective element 56 is a one-quarter pitch length radial graded objective GRIN rod. The one-quarter pitch length objective GRIN rod 56 forms a real inverted image of the field of view on a rear surface 60 of the GRIN rod 56.

The image intensifier 52 is preferably a conventional, solid-state, compact, microchannel plate ("MCP") intensifier. The MCP intensifier includes a relatively large number of parallel microchannels extending parallel to the optical axis 54. A photocathode 62 is formed on a front surface of the image intensifier 52, and the photocathode 62 covers the light path of each microchannel. The photocathode 62 also abuts the rear surface 60 of the objective rod 56.

Photons from the real inverted image at the rear surface 60 of the GRIN rod 56 strike the photocathode 62. The photocathode 62 generates photoelectrons as a result of a photoelectric effect. The photoelectrons from the photocathode 62 enter the microchannels of the MCP intensifier 52 and cascade through the microchannels, initiating an avalanche effect which increases the number of photoelectrons emerging from the rear ends of the microchannels. The number of emerging photoelectrons may be several thousand times larger than the number of photoelectrons entering each microchannel. The microchannels are so small in diameter that resolutions as high as 80 line pairs per millimeter (lp/mm) are possible.

A phosphor screen 64 is formed on a rear surface of the MCP intensifier 52. The photoelectrons which emerge from the microchannels strike the phosphor screen 64, and the phosphor screen converts the photoelectrons into photons to reconstitute the image from the objective GRIN rod 56 on the phosphor screen 64. The light energy of the image from the phosphor screen is substantially amplified compared to the light incident on the objective GRIN rod 56, due to the avalanche photoelectron multiplication effect within the MCP intensifier 52. The brightness of the image is thus amplified to a level which is perceptible to the naked eye.

The MCP intensifier 52 prevents the escape of stray light back through the objective GRIN rod 56, thereby confining the stray light to the ocular end of the sight 50. The MCP intensifier 52 is powered by small alkaline batteries (not shown) which are conveniently located for access within the housing of the sight 50.

An image inverting optical element, such as a conventional twisted fiber optic bundle 66, is next positioned along the optical axis 54. A front surface 68 of the twisted fiber optic bundle 66 abuts the phosphor screen 64. Since the objective GRIN rod 56 produces an inverted image, the twisted fiber optic bundle 66 reverts the inverted image to its original upright form. The upright image is presented at a rear surface 70 of the twisted fiber optic bundle 66.

The twisted fiber optic bundle 66 is made up of a multitude of optical fibers which have very small diameters, typically in the range of four to thirteen micrometers. Twisting the relative position of the optical fibers by 180° in the bundle 66 causes the incident image to be reverted at the viewing end of the twisted fiber optic bundle 66.

The ocular GRIN rod 58 is also a one-quarter pitch length radial graded GRIN rod. The one-quarter P ocular GRIN rod 58 projects the upright image presented by the twisted fiber optic bundle 66 for viewing by a user whose eye is placed behind a rear surface 72 of the GRIN rod 58. A front surface 74 of the ocular GRIN rod 58 abuts the rear surface 70 of the twisted fiber optic bundle 66. The front surface 74 of the ocular GRIN rod 58 may have a reticle located thereon, in the same manner as previously described, if the optical sight 50 is used for aiming.

The ocular GRIN rod 58 will preferably be at least eight millimeters in diameter so as to be larger than the typical pupil size of a human eye when fully dilated. The length of the ocular GRIN rod 58 may also be adjusted to obtain a desired magnification effect as has previously been described.

The sight 50 achieves all of the advantages and improvements associated with the sight 20. In addition, the sight 50 remains fully functional in low level light conditions where the sight 20 would be of little use. However, the sight 50 is not suitable for use in normal or high light conditions, because the image intensifier 52 typically can not accommodate high light levels such as daylight conditions without additional filter elements to subdue the light incident upon the intensifier photocathode 62. Consequently, the application of the sight 50 is primarily confined to low light level conditions.

Figure 10:
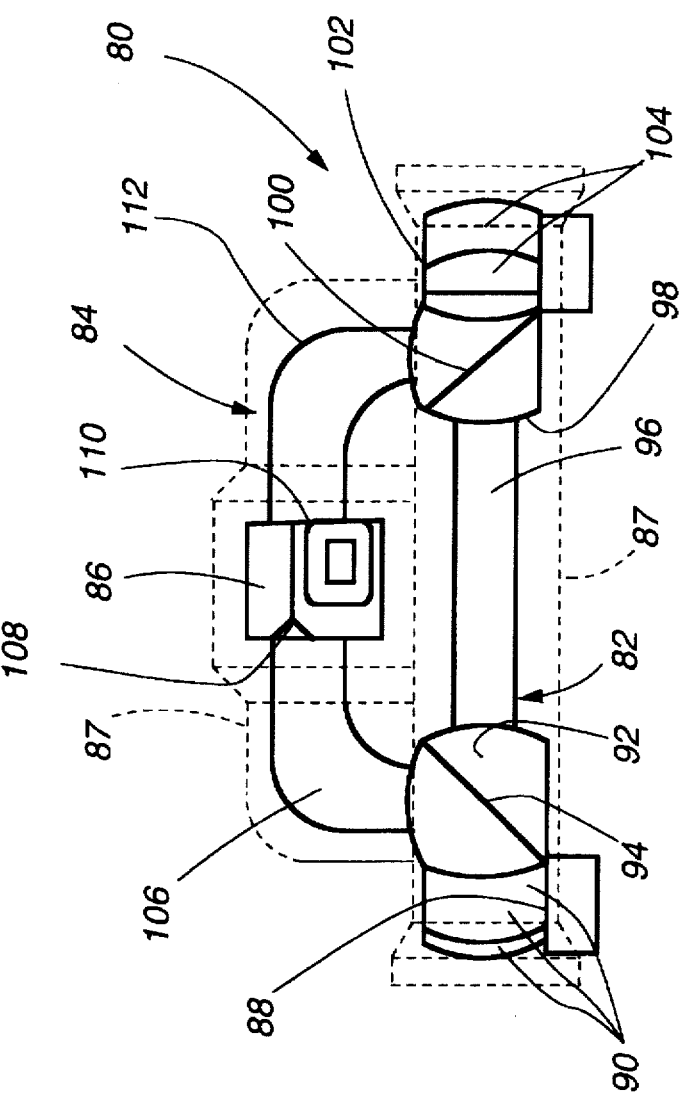
FIG. 10 is a generalized side view of optical elements of another embodiment of a GRIN optical sight of the present invention, which incorporates another arrangement of an image intensifier.

A third embodiment 80 of the optical sight of the present invention, shown in FIG. 10, achieves the advantages of both of the previously described embodiments 20 and 50. The optical sight 80 may be used with equal effectiveness in both low level and high light level conditions.

The optical sight 80 establishes first and second optical channels 82 and 84 over which the light traverses. The first optical channel 82 is functional primarily in day-time or high light level conditions. The day-time optical channel 82 is generally similar to the single optical path through the optical sight 20 (FIG. 2). The second optical channel 84 is functional primarily in night-time or low light level conditions. The night-time optical channel 84 functions similarly to the optical path through the optical sight 50 (FIG. 9), due to an image intensifier 86 used in the optical channel 84. The optical elements of the sight 80 are confined within a housing 87 shown by dashed lines.

The sight 80 includes an objective optical element 88, which may take the form of a plurality of GRIN optical elements 90, or a combination of GRIN and conventional elements. The objective GRIN elements 90 receive the incoming light from an object in the field of view.

Light from the objective GRIN elements 90 is applied to a dichroic light or beam splitter 92. The beam splitter 92 divides the light from the optical elements 90 into two wavelength or color bands. The two bands are a visible band and a near infrared invisible ("IR") band. A prescribed series of dielectric coatings (dichroic filters) on a transparent surface 94 of the beam splitter 92 causes the separation of the light into the visible and IR bands. The coatings on the surface 94 reflect light in the IR band but allow all other light to pass substantially unaffectedly through the surface 94. The surface 94 is positioned at a predetermined angle (45° is shown) to the path of the light from the objective GRIN elements 90. The IR reflective coating on the surface 94 and the angle of the surface 94 cause the IR light to be reflected into the night-time channel 84. On the other hand, the IR reflective coating on the surface 94 allows the light in the other wavelengths to pass through the surface 94 and into the day-time channel 82. By changing the type of coating on the surface 94, the bands of light reflected into the night-time channel 84 and transmitted into the day-time channel 82 can be changed. The coatings to achieve the desired reflection and transmission characteristics are known to those skilled in the art.

The light which is transmitted through the surface 94 and into the channel 82 enters an inverting element 96, such as a twisted fiber optic bundle. The objective GRIN elements 90 have previously inverted the image before the light enters the inverting element 96. The inverting element 96 rotates the inverted image by 180°, thereby reverting it to its original upright position. The upright image from the inverting element 96 is applied to a conventional dichroic light or beam combiner 98.

The beam combiner 98 also includes a surface 100 which is positioned at a predetermined angle to the light from the inverting element 96. The surface 100 also has a dielectric coating (dichroic filter) with the same or similar spectral characteristics as those of the coating on the surface 94 of the beam splitter 92. The coating on the surface 94 allows the light from the inverting element 96 to pass through the surface 100 to an ocular optical element 102. Since the coatings on the surfaces 94 and 100 have the same or similar transmissive and reflective characteristics, the light which enters the day-time channel 82 and which passes through the surface 94 and the inverting element 96 will also pass through the surface 100. Thus, the coating on the surface 100 has no effect on the light entering the beam combiner 98 from the day-time channel 82.

The ocular element 102 may take the form of a plurality of GRIN optical elements 104, or a combination of conventional and GRIN elements. The ocular GRIN elements 104 refract the light from the beam combiner 98 into an image which the user perceives. The ocular GRIN elements 104 may have curved or spherical abutting surfaces as shown in FIG. 10. The length and focal characteristics of the GRIN elements of the objective and ocular elements 88 and 102 accomplish a desired degree of magnification of the image presented to the user of the sight 80.

The IR band light reflected from the coating on the surface 94 into the night-time channel 84 first passes through a non-inverting optical element 106 (e.g., a fiber optic bundle) which transfers the image to the image intensifier 86. The image which is reflected into the non-inverting element 106 is formed by the objective GRIN elements 90.

The light from the non-inverting element 106 is applied to the image intensifier 86, which abuts the end of the non-inverting element 106. The image intensifier 86 is similar to the image intensifier 52 previously described in conjunction with the optical sight 50 (FIG. 9). Photons from the non-inverting element 106 strike a photocathode 108 on the front of the image intensifier 86. The photocathode 108 generates photoelectrons. The photoelectrons enter microchannels of the intensifier 86 and cascade through the microchannels, initiating an avalanche effect which increases by several thousand times the number of photoelectrons as they pass through the microchannels. A phosphor screen 110 formed on a rear surface of the intensifier 86 converts the emerging photoelectrons into photons to reconstitute the image at a substantially amplified visible light level.

The light emerging from the image intensifier 86 is conducted through an inverting optical element 112 (e.g., a twisted fiber optic bundle) and is applied to the beam combiner 98. The ends of the inverting element 112 abut the phosphor screen 110 of the image intensifier and the beam combiner 98.

The light from the inverting element 112 impinges on the spectrally selective coating of the surface 100. The coating on the surface 100 reflects the light from the inverting element 112, and this reflected light is combined with the light from the day-time channel 82. A single combined image of the light from both the day-time and night-time channels 82 and 84, respectively, results. This combined image is presented to the user by the ocular GRIN elements 104.

Figure 11:
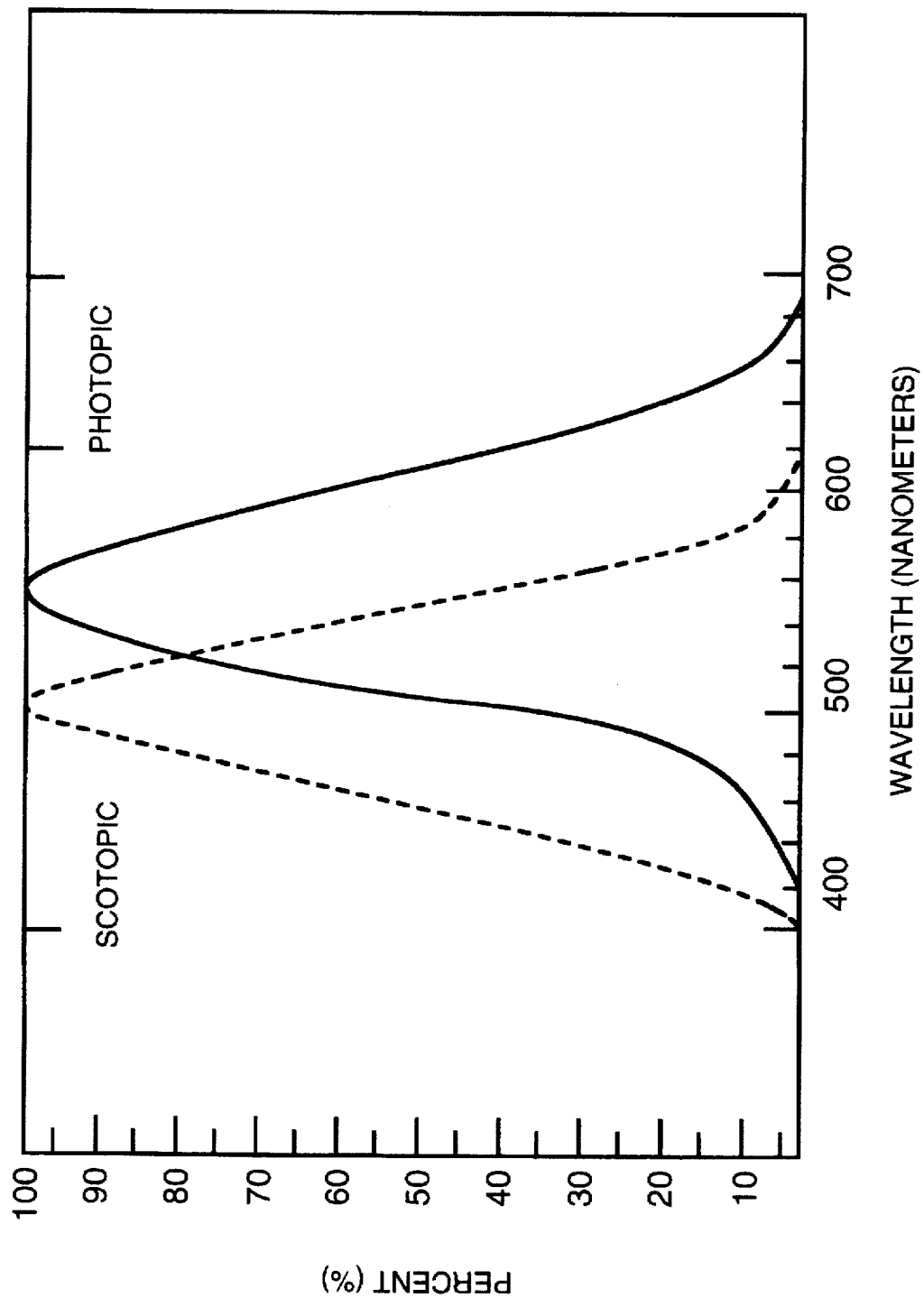
FIG. 11 is a graph of the responsiveness of the human eye in day-time or high level light conditions (photopic sensitivity) and the response of the human eye in darkness or low level light conditions (scotopic sensitivity).

The image presented to the user of the sight 80 is an optimum image under both high level light and low level light viewing conditions. This can be understood by reference to FIG. 11, which illustrates the responsiveness of the human eye to wavelengths of light, measured in nanometers ("nm"), under both photopic (i.e., day-time or high level light conditions) and scotopic (i.e., night-time or low level light conditions). The photopic sensitivity of the human eye peaks at wavelengths of about 560 nm. The scotopic sensitivity peaks at wavelengths of about 500 nm. However, there is an overlapping and relatively high responsiveness under both photopic and scotopic conditions at about 530 nm. It should also be noted that the human eye exhibits considerably diminished responsiveness to IR wavelengths of about 650 nm and above.

Since the human eye is generally not responsive to the IR band of light, the diversion of the IR band energy from the day-time channel 82 into the night-time channel 84 represents no significant loss in perception to the user. However the diverted IR band light energy in the night-time channel 84 is amplified and converted by the image intensifier 86 into a wavelength at about 530 nm. This amplified and wavelength-converted light is added to that in the day-time channel 82 by the beam combiner 98 to supplement and enhance the image within the wavelength range which is perceivable by the user. By combining the images in the day-time and night-time channels, the sight 80 provides maximum use of all available light energy for imaging under both day and night conditions.

Figure 12:
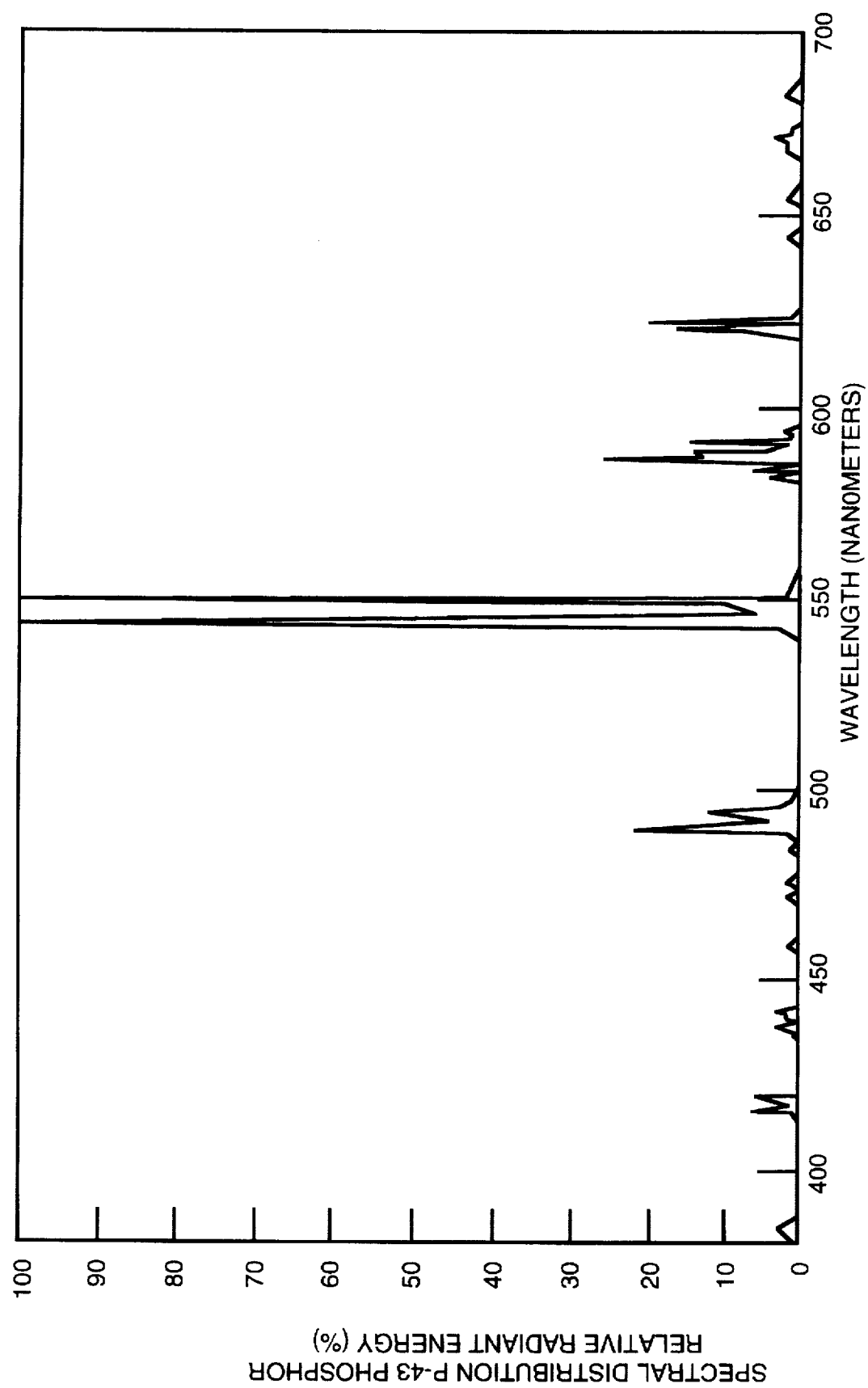
FIG. 12 is a graph of the light energy emission characteristics of a P-43 phosphor which is preferably used in an image intensifier of the sight shown in FIG. 10.

In the preferred embodiment, the light in the IR band reflected by the beam splitter 92 into the night-time channel 84 preferably has a wavelength of about 650 nm. This wavelength includes orangish-red light to which the human eye has relatively low response. The amplified number of photoelectrons which emerge from the microchannels of the image intensifier 86 strike the phosphor screen 110. The type of phosphor employed is preferably one which has maximum light emissive wavelength characteristics near the overlapping photopic and scotopic responsiveness conditions of the human eye at about 530 nm. It has been found that a P-43 phosphor has a maximum responsiveness at about 540 nm as shown in FIG. 12. This frequency is satisfactory to provide good responsiveness for the human eye under both photopic and scotopic conditions.

Thus by using the P-43 phosphor for the screen 110 on the rear of the image intensifier 86, the essentially imperceptible light energy in the IR band is converted into light at a 540 nm wavelength, the emission wavelength of the P-43 phosphor. This wavelength offers relatively good perception under both low level and high level light conditions.

Because the P-43 phosphor output wavelength is centered at about 540 nm and has some wavelength spread, some loss of daylight is necessary in order to bring the light from the image intensifier 86 into the light path from the ocular element 102 (FIG. 10). A coating on the surface 100 which reflects the P-43 wavelength light from the image intensifier 86 and passes the daylight from the day-time channel 82 is therefore preferred.

Figure 13:
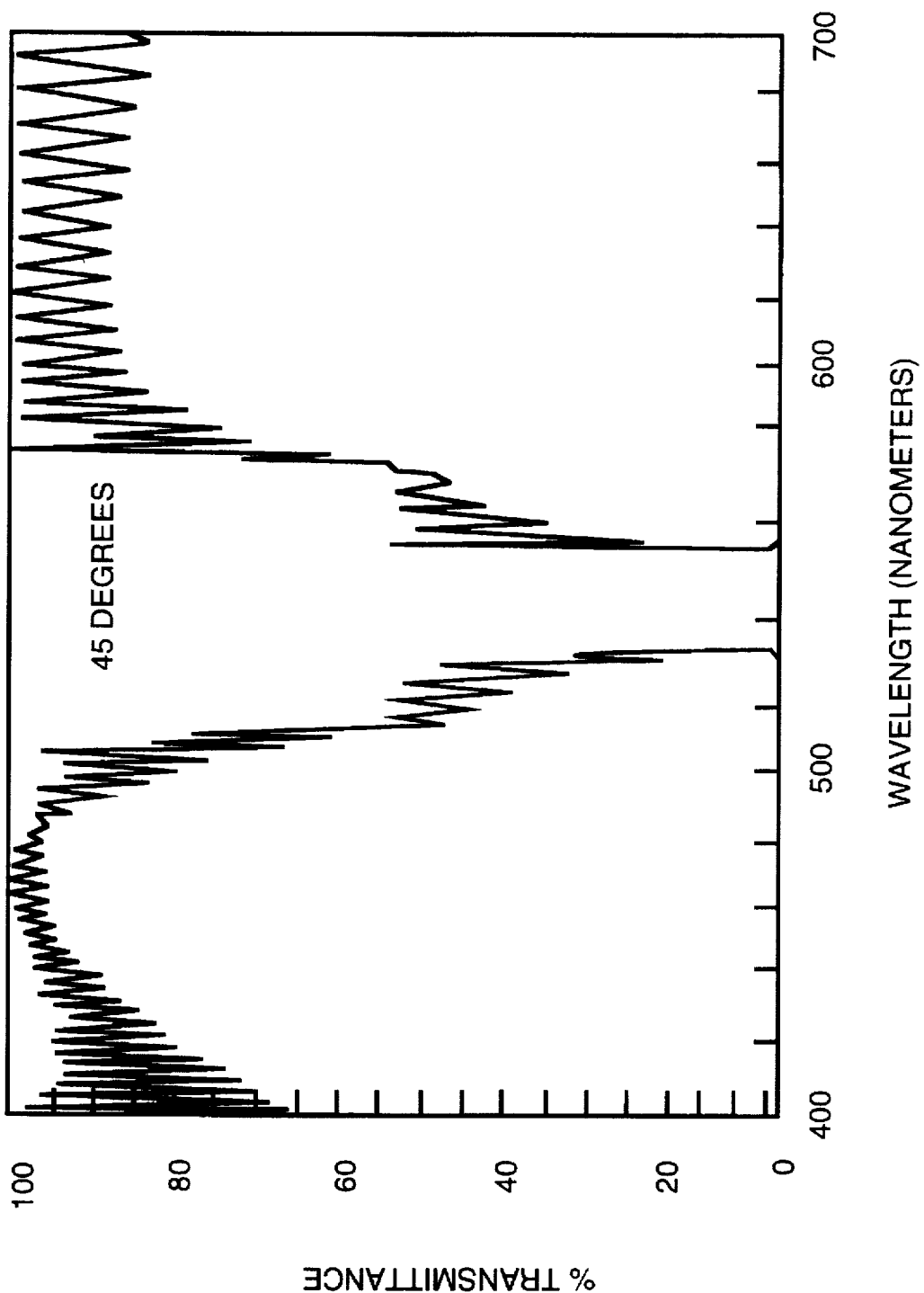
FIG. 13 is a graph of light transmission of a dichroic filter coating of the sight shown in FIG. 10, at a 45° angle of incidence.
Figure 14:
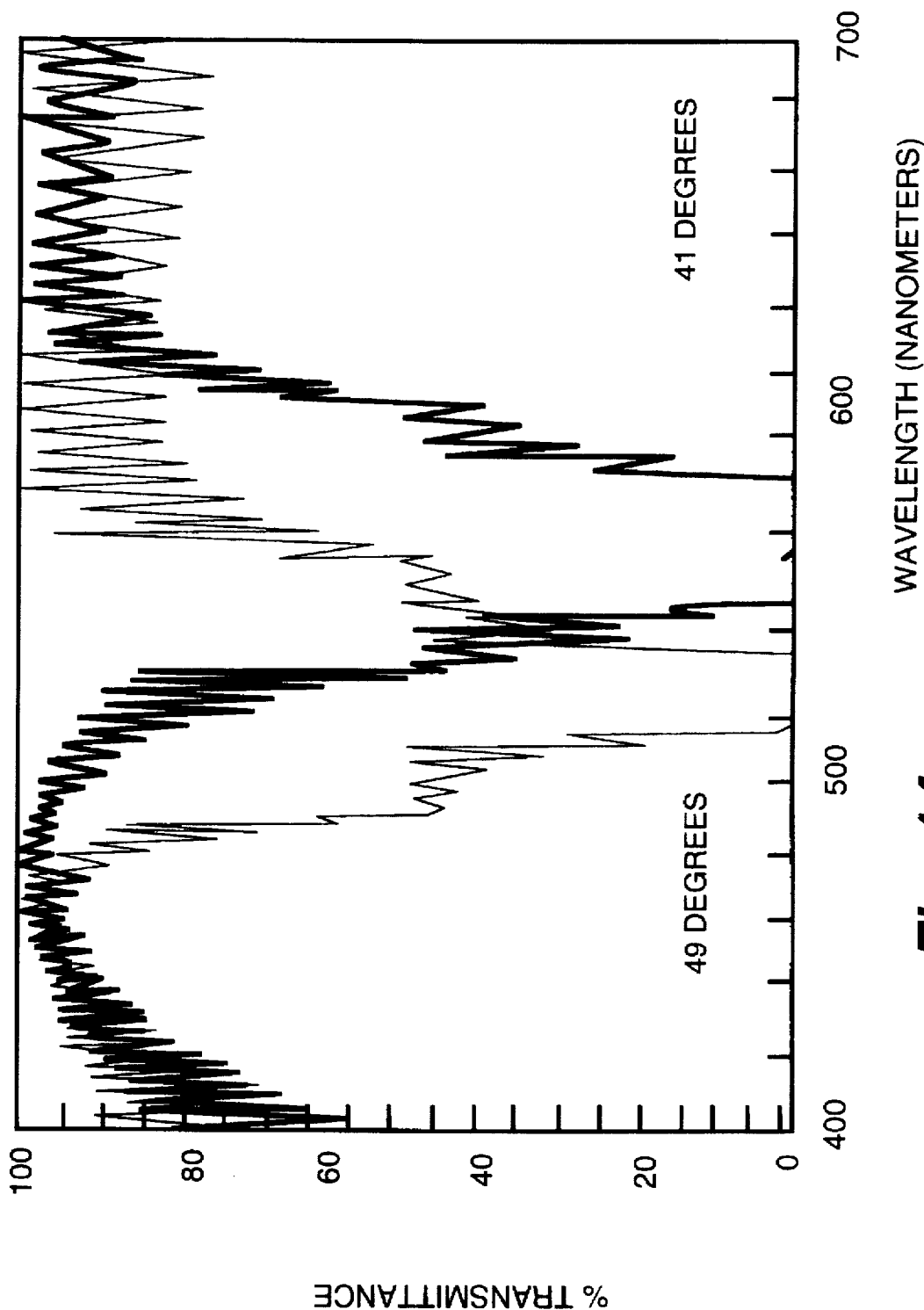
FIG. 14 is a graph of light transmission of a dichroic filter coating of the sight shown in FIG. 9, at 41° and 49° angles of incidence.

Also, the performance of the dichroic filter coatings on the surface 100 is affected by the angle of incidence of the incoming light. If coverage is desired over a large field of view (FOV), the angle of incidence of the incoming light should be considered in relation to the reflectance of the dichroic filter coatings. FIGS. 13 and 14 illustrate the transmission of light as a function of wavelength for several angles of incidence. The reflectance is equal to 1 minus the transmittance. Some of the light will be reflected even at the extreme angles of incidence. Practically, this means that the night vision image will be weaker at the edges of the FOV than at the center of the FOV.

The above discussion often refers to GRIN rods having a refractive index which varies along the radius of the rod. Alternatively, the GRIN element may have an index of refraction which varies axially along the optical axis (i.e., axial gradient). As another alternative, the lens may have an index of refraction which varies spherically (radially from a point). It is also possible to have a GRIN element in which the index of refraction varies in a customized fashion including a combination of the three types of gradients described above to achieve the desired optical effect. While any of these types of GRIN elements may be used with the optical sights of the invention, the axial index GRIN element has been easier to manufacture in the desired size and with the desired range of refractive indexes.

GRIN optical elements, because of their potential for ruggedness and compactness, are conducive to use in optical sight systems. The GRIN elements are held in a tubular housing which can also contain the aiming reticle. The housing is only slightly larger than the diameter of the GRIN elements so that the entire sight is compact and rugged. The housing can be held in two collars, one at each end. One collar can be precisely adjusted horizontally for windage and the other collar can be precisely adjusted vertically for elevation.

A presently preferred embodiment of the present invention has been described above with a degree of specificity. It should be understood, however, that this degree of specificity is directed toward the preferred embodiment. The invention itself is defined by the scope of the appended claims.

The invention claimed is:

1. An aiming sight including graded index optical elements, each of which is referred to as a GRIN element, comprising:

an objective optical element including at least one GRIN element, said objective optical element having a front surface upon which light from an object impinges and a rear surface from which the light from the object passes from the objective element;

an ocular optical element including at least one GRIN element, said ocular optical element being aligned in an optical path with said objective optical element and having a front surface upon which the light from the objective optical element enters and a rear surface from which the light from said aiming sight exits;

a beam splitter positioned in the optical path to receive the light from the objective optical element, the beam splitter operatively splitting the light from the objective optical element into a first range of wavelengths of visible light and a second range of wavelengths or invisible light;

a first light channel positioned to receive light within the first range of wavelengths from the beam splitter;

a second light channel seperate from the first channel and positioned to receive light within the second range of wavelengths from the beam splitter;

a beam combiner positioned to receive and combine the light from the first and second light channels and to apply the combined light to the ocular optical element;

an image intensifier in the second light channel between the beam splitter and the beam combiner;

a first optical element located within the first light channel between the beam splitter and the beam combiner;

a second optical element located within the second light channel between the beam splitter and one end of the image intensifier; and a third optical element located within the second light channel between an opposite end of the image intensifier and the beam combiner; and wherein:
said first, second and third optical elements provide for a substantially voidless aiming sight.

2. An aiming sight as defined in claim 1 wherein:

the image intensifier responds to light within the second range of wavelengths and converts the light within the second range of wavelengths to light substantially at a predetermined visible wavelength; and the beam combiner combines the visible light from the first channel with the light from the second channel which has been rendered visible by the image intensifier.

3. An aiming sight as defined in claim 2 wherein:

the image intensifier further comprises a solid-state, microchannel plate intensifier.

4. An aiming sight as defined in claim 3 wherein the microchannel plate intensifier comprises:

a photocathode which generates photoelectrons in response to photons of light from the objective optical element;

a plurality of microchannels, each microchannel extending from one end of the image intensifier adjacent the photocathode to an opposite end of the image intensifier in a path substantially parallel to the paths of the other microchannels, and each microchannel responding to photoelectrons within the microchannel in an avalanche manner to increase the number of photoelectrons within the microchannel; and a phosphor surface located at the opposite end of the image intensifier, the photoelectrons from the microchannels impinging on the phosphor surface, and the phosphor surface emitting light substantially at the predetermined wavelength in response to and in direct relationship to the number of photoelectrons impinging on the phosphor surface.

5. An aiming sight as defined in claim 2 wherein the beam splitter and the beam combiner each further comprise:

a transparent surface positioned at a predetermined angle to the optical path through the objective and ocular optical elements; and a dichroic coating on the transparent surface.

6. An aiming sight as defined in claim 6 wherein:

the dichroic coating on the transparent surface of the beam splitter passes light within the first range of wavelengths into the first channel and reflects light within the second range of wavelengths into the second channel.

7. An aiming sight as defined in claim 5 wherein:

the dichroic coating on the transparent surface of the beam combiner passes light within the first range of wavelengths from the first channel into the ocular optical element and reflects the light substantially at the predetermined wavelength from the second channel into the ocular optical element.

8. An aiming sight as defined in claim 1 wherein:

each of the first, second and third optical elements comprises a plurality of optical fibers arranged in a bundle.

9. An aiming sight as defined in claim 8, wherein:

the bundle of optical fibers which makes up the first optical element is twisted substantially 180° to invert an image passing through said first optical element; and the bundle of optical fibers which makes up the third optical element is twisted substantially 180° to invert an image passing through said third optical element.

* * * * *

UNITED STATES PATENT AND TRADEMARK OFFICE
CERTIFICATE OF CORRECTION

PATENT NO. : 5,644,122
DATED : July 1, 1997
INVENTOR(S) : Kenneth E. Siegenthaler and James R. Rotge It is certified that error appears in the above-indentified patent and that said Letters Patent is hereby corrected as shown below:

Column 12, Claim 6, Line 1, delete "claim 6" and insert therefor--claim 5--.

Column 12, Claim 6, Line 1, delete "claim 6" and insert therefor -- claim 5 --.

Signed and Sealed this

Twenty-third Day of September, 1997

Attest:

BRUCE LEHMAN

Attesting Officer

Commissioner of Patents and Trademarks